United States Patent [19]

Wu

[11] Patent Number: 5,416,681
[45] Date of Patent: May 16, 1995

[54] COLOR FILTER ASSEMBLY FOR STAGE LIGHTING

[76] Inventor: Wen-Chong Wu, No. 4-1, LN324, An Kang Road, Taipei, Taiwan, Prov. of China

[21] Appl. No.: 267,914

[22] Filed: Jul. 6, 1994

[51] Int. Cl.⁶ .............................................. F21V 9/00
[52] U.S. Cl. ............................... 362/284; 362/293; 362/277; 359/889
[58] Field of Search ............... 362/277, 280, 281, 283, 362/284, 293, 319; 359/813, 814, 889, 891, 892

[56] References Cited

U.S. PATENT DOCUMENTS

| | | | |
|---|---|---|---|
| 4,894,760 | 1/1990 | Callahan | 362/293 |
| 4,914,556 | 4/1990 | Richardson | 362/293 |
| 5,163,749 | 11/1992 | Wu | 362/147 |
| 5,258,895 | 11/1993 | Bosse | 362/284 |
| 5,283,723 | 2/1994 | Wu | 362/147 |

FOREIGN PATENT DOCUMENTS 0246803 11/1991 Japan ..................... 362/293

Primary Examiner—Ira S. Lazarus
Assistant Examiner—Sara Sachie Raab
Attorney, Agent, or Firm—Bacon & Thomas

[57] ABSTRACT

A color filter assembly having a color filter wheel revolvably mounted within a hole on a slide being reciprocated in a track, for the filtration of the light of a stage lighting through at least one lens thereof. In one embodiment of the invention, the color filter wheel has a single lens, which has a plurality of refracting edges for refracting light in different directions. In another embodiment of the invention, the color filter wheel has a plurality of lens mounts meshed with one another to hold a respective color filter lens and turned by a motor drive to respectively filtrate a specific color from the light of the stage lighting.

8 Claims, 8 Drawing Sheets

COLOR FILTER ASSEMBLY FOR STAGE LIGHTING

BACKGROUND OF THE INVENTION

The present invention relates to a color filter assembly for use with a stage lighting to produce a variable lighting effect.

It has been well known that putting different color filter lenses or different light tight objects having variously shaped through holes in the passage of the light of a light source, can change the color or projecting pattern of the light. Examples of the applications of these techniques have been seen in U.S. Pat. No. 5,283,723 under the title of "Backward Projection Type Wall Lamp" and U.S. Pat. No. 5,163,749 under the title of "Wall Lamp With Refraction Lenses". The common drawback of these wall lamps is that they can only produce a fixed lighting pattern.

FIG. 1 shows an arrangement of a stage lighting which produces a variable lighting effect.

The arrangement includes a light source (high power lamp), a reflector and a fan aligned at the right side, and a rotary color filter wheel aligned at the left side. The light of the light source is reflected onto the color filter wheel by the reflector, and then reflected in different directions by a spherical reflecting mirror. The color filter wheel has a plurality of gratings disposed at different locations. When the color filter wheel is turned, the gratings pass through the passage of the light one after another, causing the pattern of light changed alternatively. At the same time, the spherical reflecting mirror is turned to reflect the light in different directions. Because the color filter wheel and the motor drive, which drives the color filter wheel, are both installed in the passage of the light, they constantly receive the heat of the light source causing their service life shortened. Another drawback of this arrangement is that the gratings of the color filter wheel are not changeable. As the light of the light source filtrated through the color filter wheel and then reflected by the spherical reflecting mirror, the intensity of the light is attenuated.

SUMMARY OF THE INVENTION

The present invention has been accomplished to provide a color filter wheel assembly for a stage lighting which produces a variable lighting effect. According to one aspect of the present invention, the color filter assembly comprises a color filter wheel revolvably mounted within a hole on a slide for the filtration of the light of a stage lighting through at least one lens thereof. According to another aspect of the present invention, the slide is made to slide in a track on a base frame, and therefore the color filter wheel can be moved into or away from the passage of the light of the stage lighting. According to one embodiment of the present invention, the color filter wheel has a single lens, which has a plurality of refracting edges for refracting light in different directions. According to another embodiment of the present invention, the color filter wheel has a plurality of lens mounts meshed with one another to hold a respective color filter lens and turned by a motor drive to fillrate a specific color from the light of the stage lighting.

DETAILED DESCRIPTION OF THE PREFERRED EMBODIMENT

Figure 1:
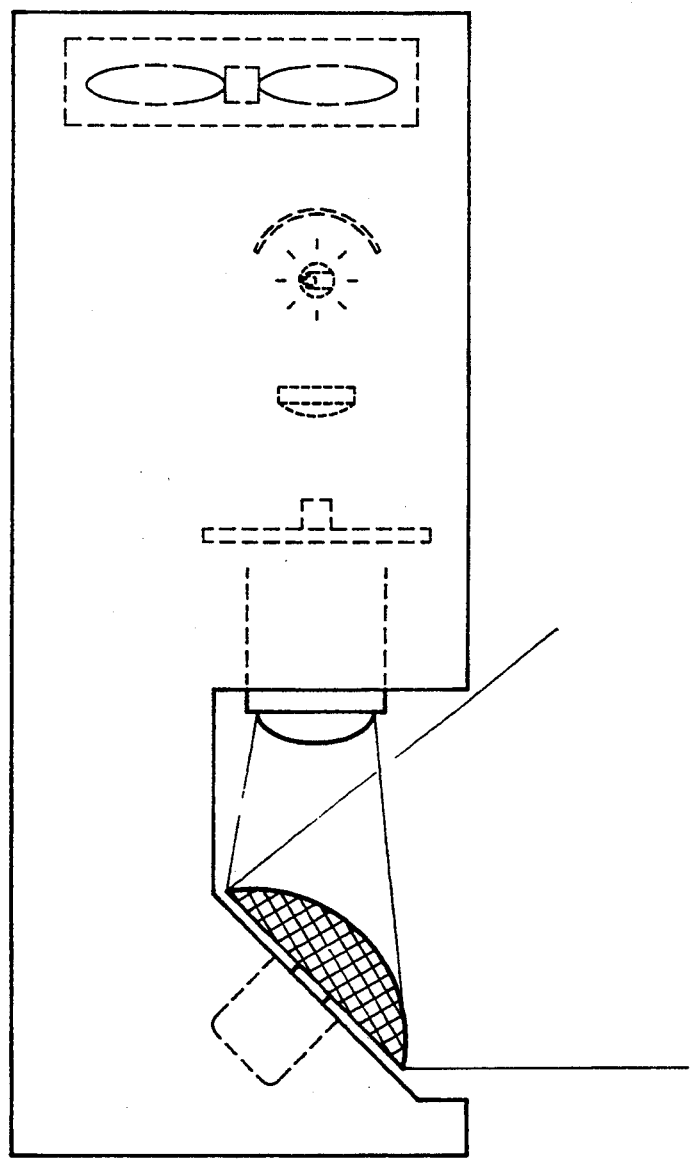
FIG. 1 shows the installation of a conventional stage lighting.
Figure 2:
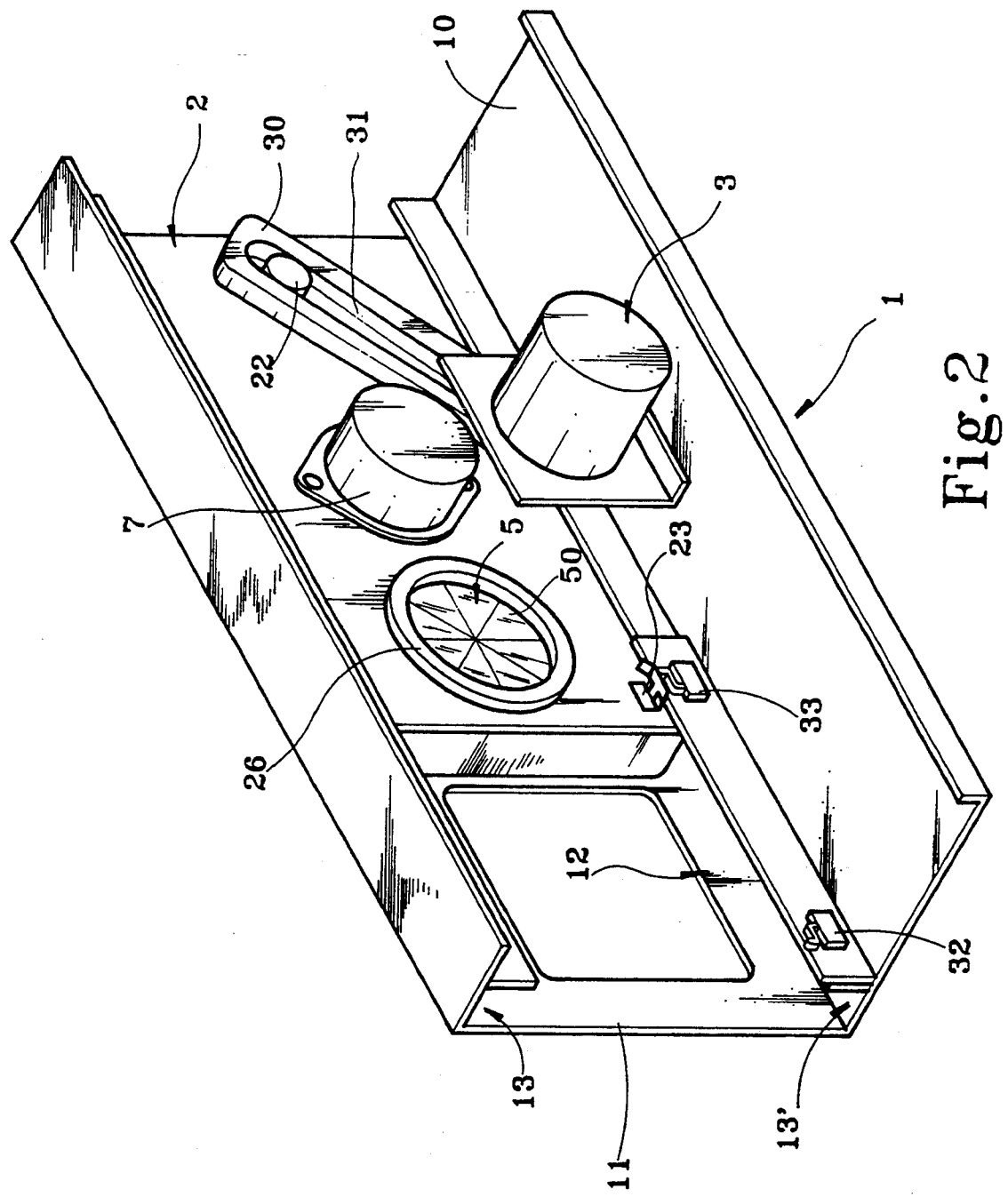
FIG. 2 is a perspective view of a color filter assembly according to the present invention.
Figure 3:
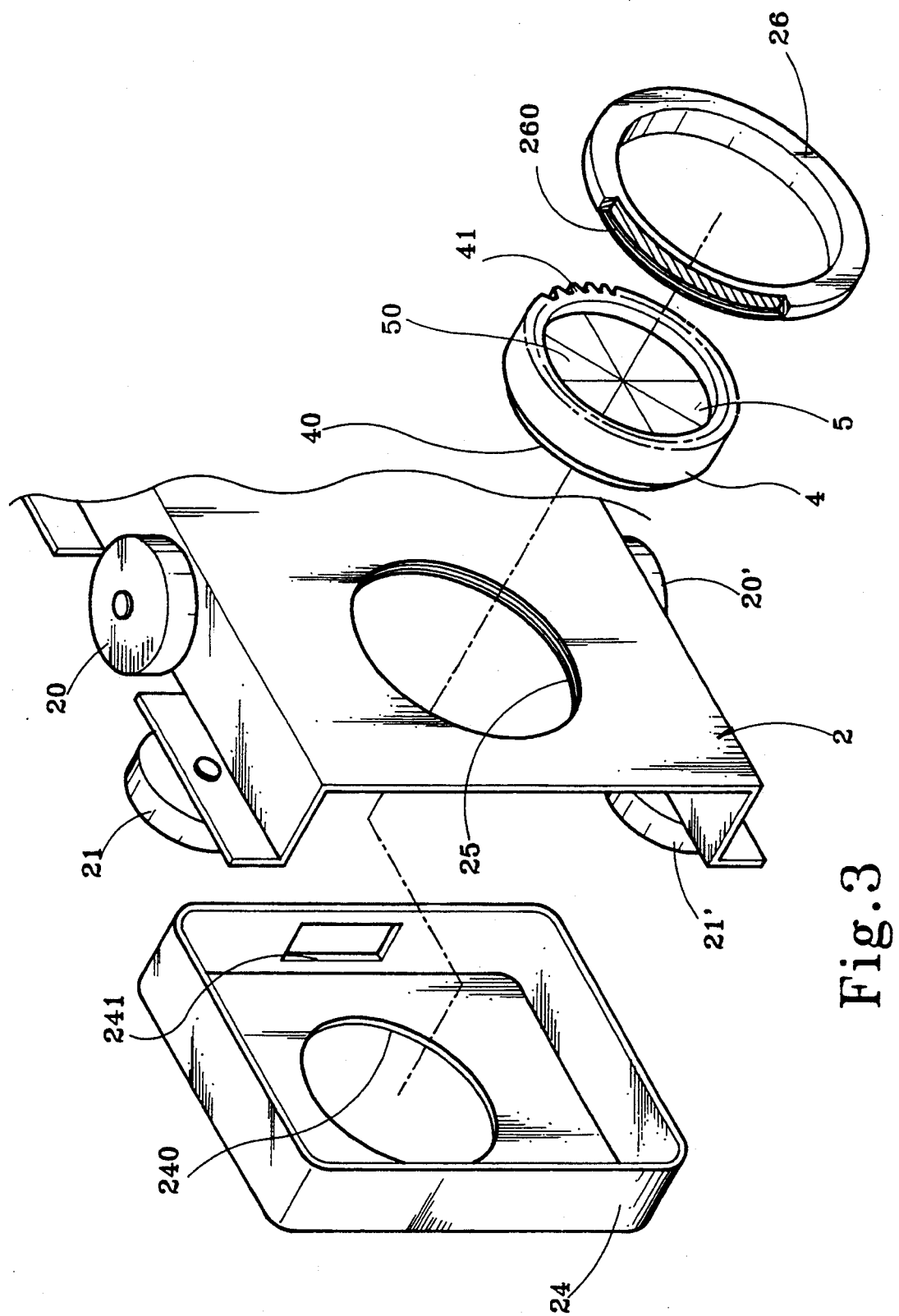
FIG. 3 is an exploded view of parts of the color filter assembly shown in FIG. 2, showing the mounting structure of the color filter wheel.
Figure 4:
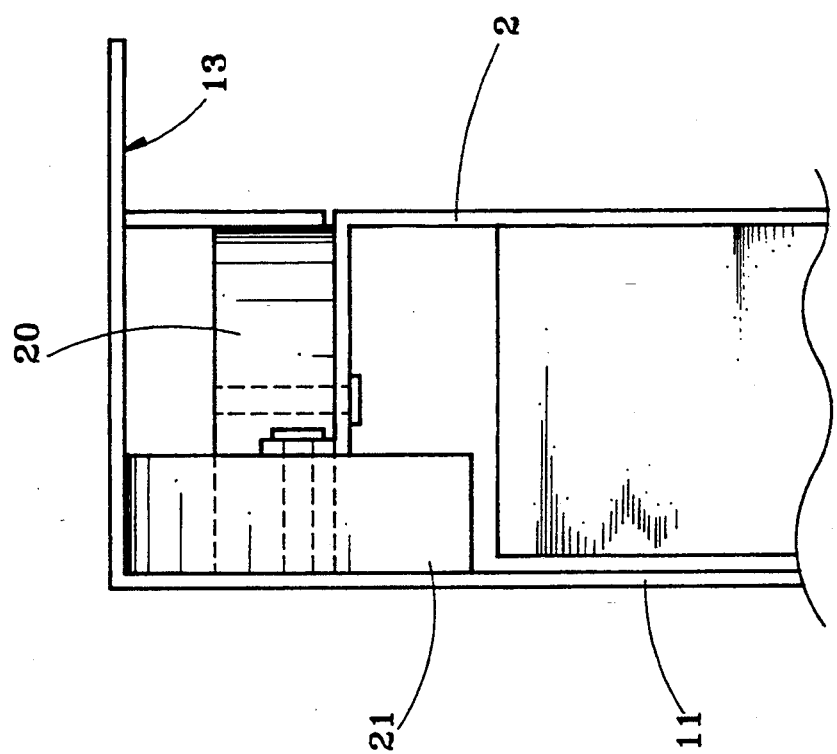
FIG. 4 shows the slide of the color filter assembly of FIG. 2 equipped with horizontal rollers and vertical rollers.
Figure 5A:
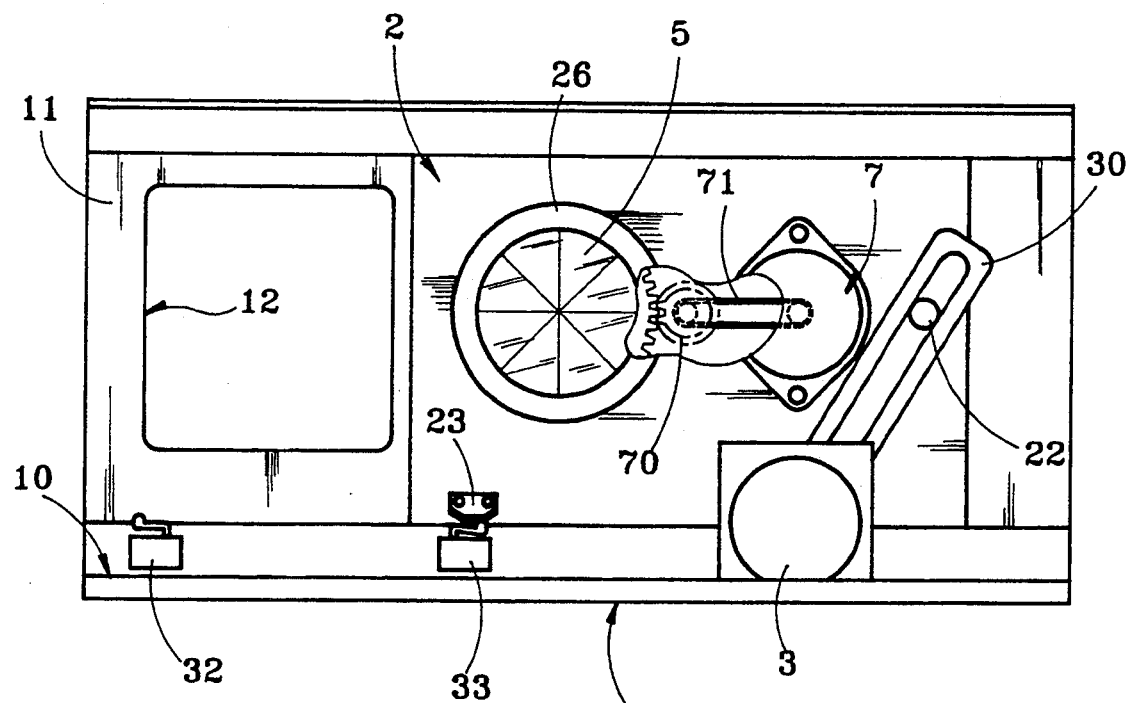
FIG. 5A is a front elevational view of the color filter assembly shown in FIG. 2, showing the color filter wheel moved away from the projecting hole on the base frame.

Referring to FIGS. 2 and 3, a color filter assembly in accordance with the present invention comprises a metal base frame 1 having a horizontal wall 10 and a vertical wall 11. The vertical wall 11 is made of rectangular shape having a projecting hole 12 at one side, through which the light of a stage lighting is projected onto the stage, and two horizontal rails 13 and 13' respectively extended from the top and bottom sides thereof at right angles along the length. A slide 2 is made to slide in the track defined between the horizontal rails 13 and 13'. The slide 2 is equipped with symmetrical pairs of horizontal rollers 20 and vertical rollers 21 (see FIG. 4) at the four corners thereof and respectively supported on the vertical wall 11 and the horizontal rails 13 and 13'. By means of the rollers 20 and 21, the slide 2 can be reciprocated in the track between the rails 13 and 13'. A servo-motor 3 is mounted on the horizontal wall 10 of the base frame 1. A link 30 is coupled to the output shaft (not shown) of the servo-motor 3. The link 30 has an elongated slot 31 disposed in parallel with the vertical wall 11 and mounted on an upright rod 22 on the slide 2. As the servomotor 3 is turned in either direction, the slide 2 is driven by the link 30 to move leftward or rightward in the track between the rails 13 and 13' (see FIGS. 5A and 5B). There are limit switches 32 and 33 respectively controlled by a control lever 23 to stop the servo-motor 3 so as to limit the leftward and rightward strokes of the slide 2 in the track between the rails 13 and 13'. The control lever 23 is mounted on the slide 2. When the slide 2 is moved to the left or right limit position, the control lever 23 will trigger either limit switch 32 or 33 to stop the servomotor 3. A color filter wheel 4 is mounted within a circular screw hole 25 on the slide 2 by a mounting ring 26 to hold a projecting lens 5, having an annular flange 40 at an inner side revolvably inserted into an axle hole 240 on a cap 24. The mounting ring 26 has an outer thread 260 threaded into the circular screw hole 25 to hold the projecting lens 5 on the inside. When the projecting lens 5 is aligned with the projecting hole 12, a fancy lighting effect is produced by projecting the light of a light source through the projecting lens 5 and the projecting hole 12. The projecting lens 5 comprises a plurality of refracting edges 50, which refract light in all directions. The refracting edges 50 may be differently colored to filtrate different colors of light.

Figure 5B:
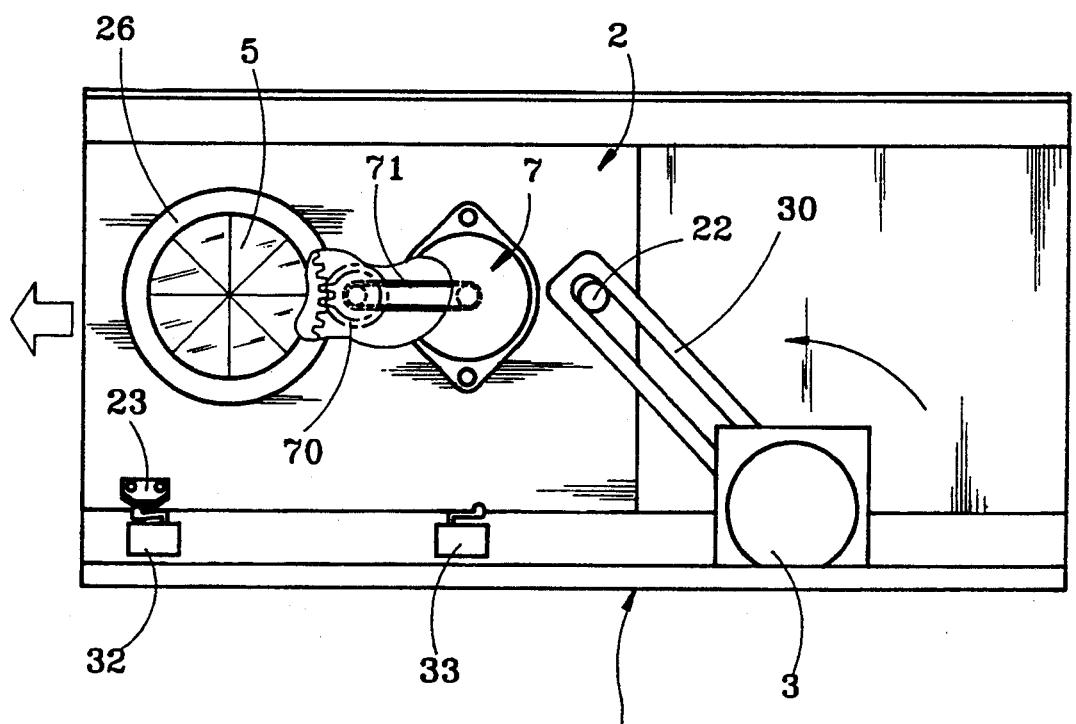
FIG. 5B is similar to FIG. 5A but showing the color filter wheel aligned with the projecting hole on the base frame.
Figure 7:
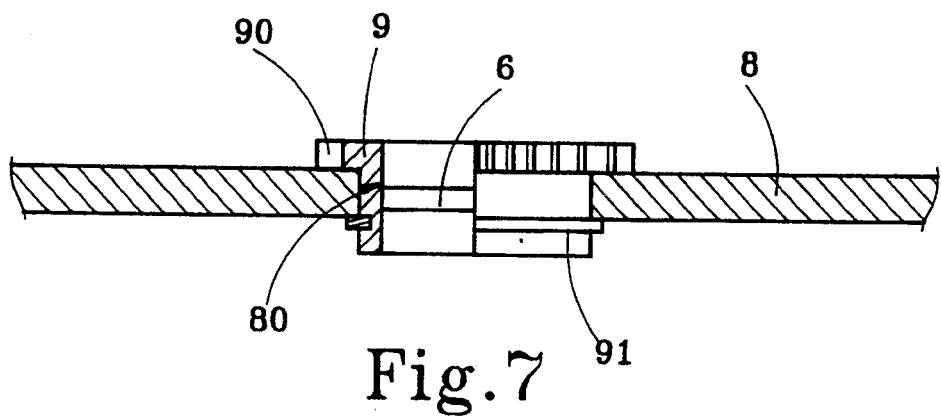
FIG. 7 is a sectional view of the color filter wheel of FIG. 6.

Referring to FIG. 5B and FIGS. 2 and 3 again, the color filter wheel 4 further comprises a series of teeth 41 equally spaced around the periphery and meshed with a gear wheel 71. The gear wheel 71 is turned by a second servo-motor 7 through a transmission belt 71. The cap 24 has a side opening 241 for passing the transmission belt 71. The second servo-motor 7 is fixedly mounted on the slide 2 at a suitable location. When the second servo-motor 7 is started, the color filter wheel 4 is turned round and round causing the refraction of light changed.

Figure 6:
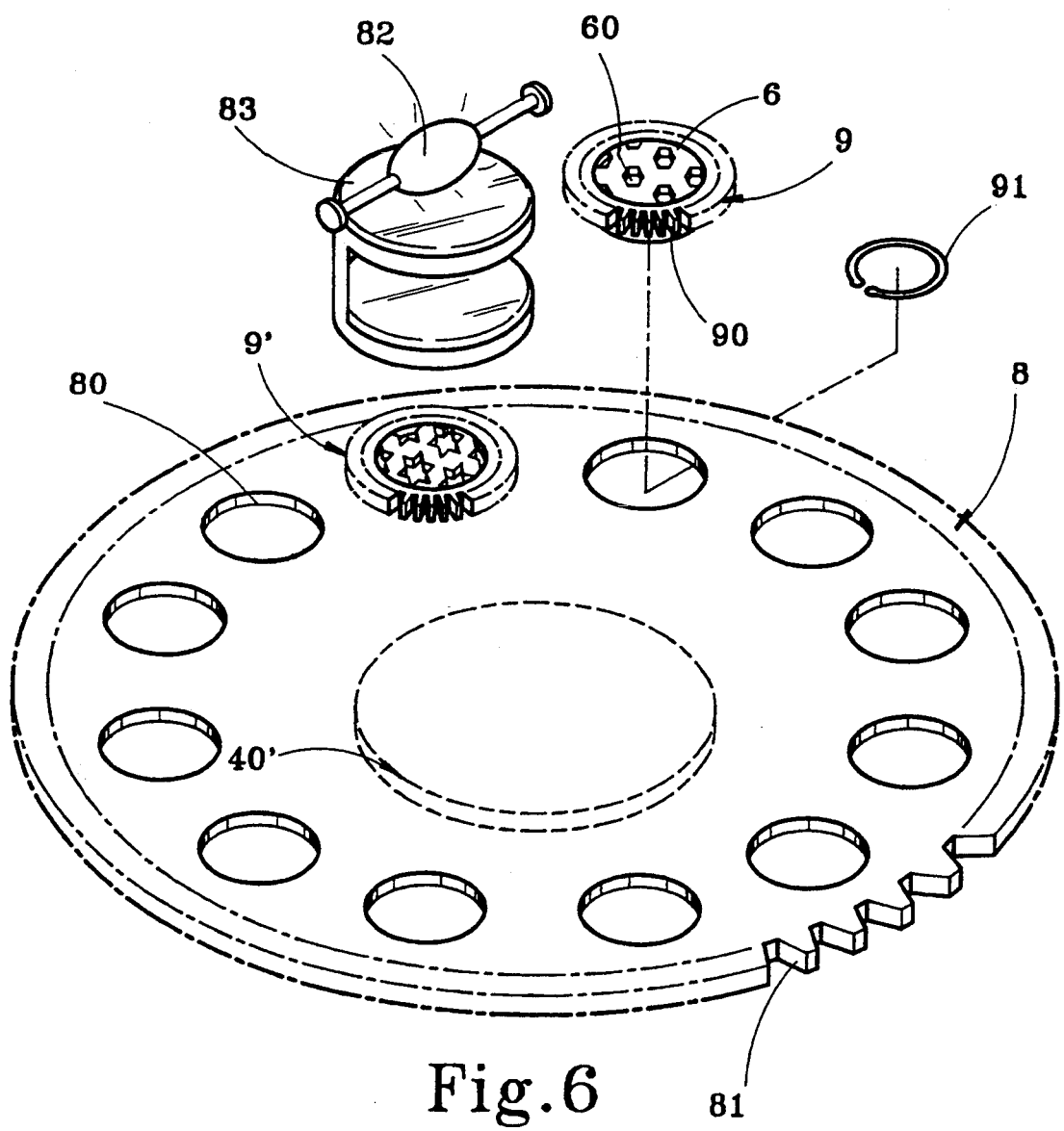
FIG. 6 shows an alternate form of the color filter wheel according to the present invention.
Figure 8:
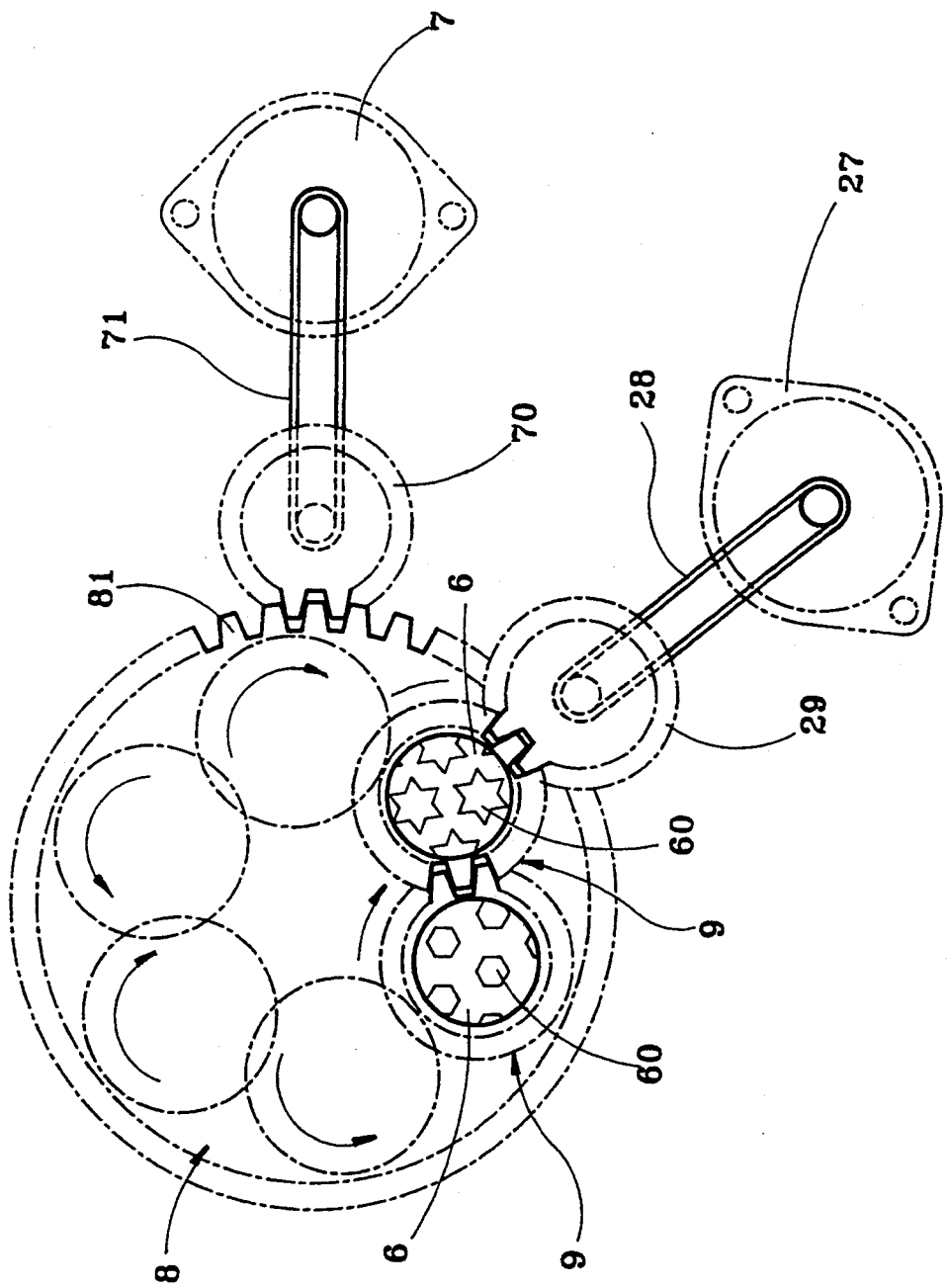
FIG. 8 shows the color filter wheel of FIG. 6 turned by the second servo-motor and the lens mounts thereof turned by the third servomotor.
Figure 9:
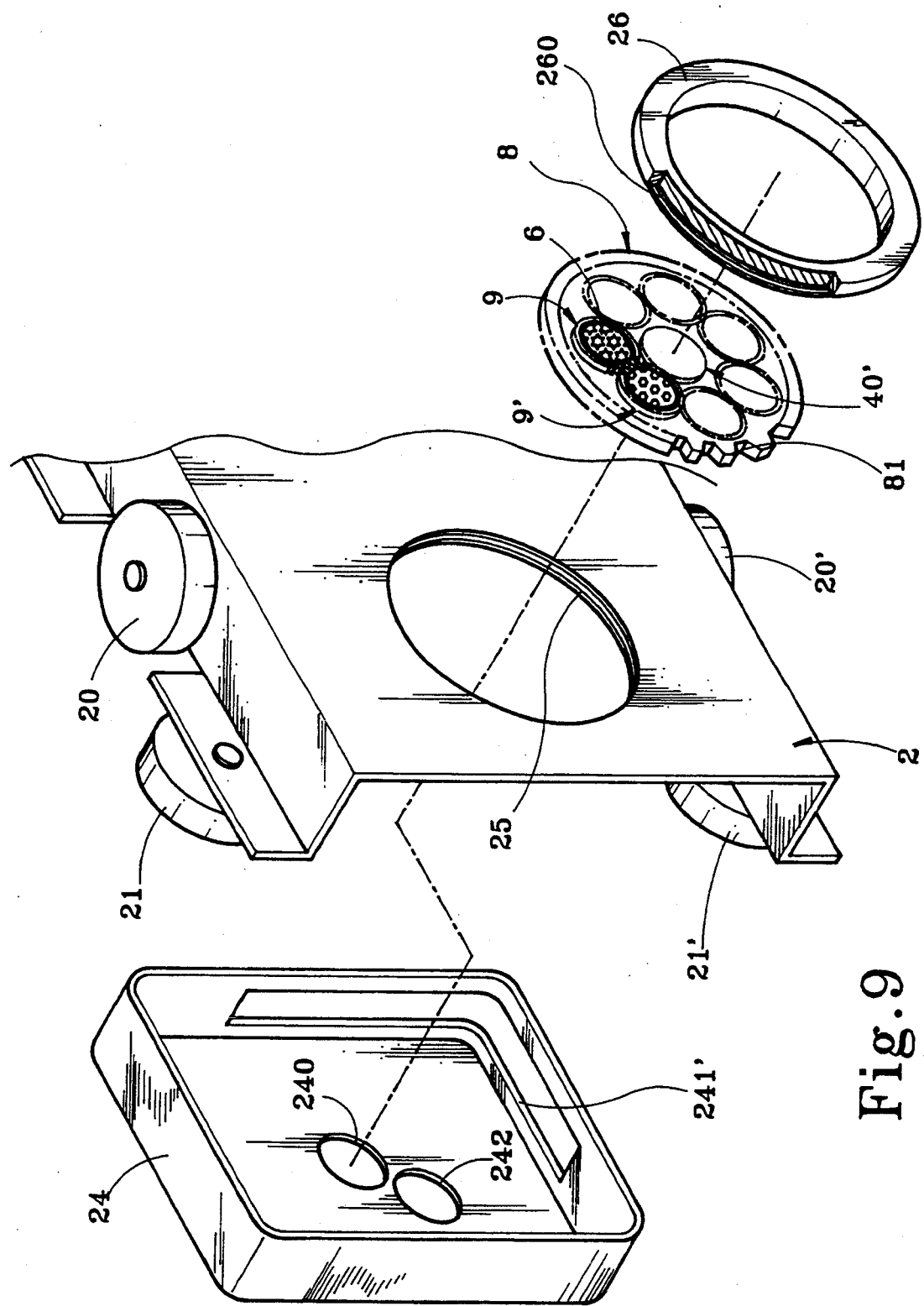
FIG. 9 shows the mounting structure of the color filter wheel of FIG. 6.

Referring to FIG. 6 therein illustrated shows an alternate form of the projecting lens. The projecting lens, referenced by 6, is made from light tight material having a plurality of projecting holes 60 of different shapes for passing light (see also FIG. 8).

Referring to FIGS. 6, 7, 8, and 9, therein illustrated is an alternate form of the color filter wheel. As illustrated, the color filter wheel, referenced by 8, comprises a series of teeth 81 equally spaced around the periphery for meshing with the aforesaid gear wheel 70, an even number of round holes 80 equiangularly spaced around the center, a plurality of lens mounts 9 respectively revolvably mounted within the round holes 80 to hold a respective projecting lens 5 or 6. Each lens mount 9 comprises a series of teeth 90 equally spaced around the periphery of the front end thereof and disposed at the front side of the color filter wheel 8. When the lens mounts 9 are respectively mounted within the round holes 80, they are meshed with one another through the respective series of teeth 90. The rear end of each lens mount 9 is disposed at the back side of the color filter wheel 8 and retained by a respective clamp 91 (see FIG. 7). Because of the arrangement of the clamp 91 on each lens mount 9, the lens mounts 9 do not fall out of the round holes 80. In order to match with the color filter wheel 8, the cap 24 has an axle hole 240, which receives the annular flange 40' on the back side of the color filter wheel 8 at the center, a projecting hole 242 aligned between the projecting hole 12 on the aforesaid vertical wall 11 and either lens mount 9. When the second servo-motor 7 is turned on to rotate the color filter wheel 8, the lens mounts 9 are alternatively aligned with the projecting holes 242 and 12 for passing the light of the projecting lamp 82 through a condenser lens 83.

There is also provided a third servomotor 27 mounted on the aforesaid slide 2 and control led to turn the lens mounts 9 through a transmission belt 28 and a gear wheel 29. Because the lens mounts 9 are meshed with one another, when one lens mount 9 is turned by the third servo-motor 27 through the transmission belt 28 and the gear wheel 29, all lens mounts 9 are synchronously turned to change the projecting pattern of light.

As indicated, the color filter wheels 4 and 8 as well as the projecting lenses 6 can be alternatively changed as desired, so as to provide different lighting effects. The second and third servo-motors 7 and 27 may be stopped or turned on to change the projecting patterns of light.

When not in use, the slide 2 is moved rightward by the first servo-motor 3 to carry the color filter wheel 4 or 8 away from the projecting hole 12.

Furthermore, the lens mount 9 is made through powder metallurgy and treated through an oil immersion process. Therefore, the lens mount 9 is self-lubricated when heated by the radiation of light, and can be smoothly turned within the respective round hole 80. However, the longitudinal depth of the lens mount 9 must be made as short as possible so as not to attenuate the intensity of light passing through. Of course, the color filter wheel 8 must be made as thin as possible.

I claim:

1. A color filter assembly comprising:
   a base frame having a projecting hole on a vertical wall thereof for passing light of a stage lighting projecting lamp and a track transversely defined within said vertical wall over said projecting hole;
   a slide moved along said track, said slide having a circular mounting hole and a cap disposed at a back, said cap having an axle hole aligned with said circular mounting hole;
   a motor drive controlled to move said slide in said track; and
   a color filter wheel revolvably mounted within said axle hole and said circular mounting hole and moved by said slide to become in alignment with said projecting hole for the filtration of the light of said stage lighting through at least one lens thereof.

2. The color filter assembly of claim 1 wherein said slide is equipped with vertical rollers and horizontal rollers moved in said track.

3. The color filter assembly of claim 1 wherein said motor drive comprises a servo-motor having an output shaft, a stub rod made on said slide at a front side, and a link having one end coupled to said output shaft and an opposite end made with an elongated slot mounted around said stub rod and driven by said servo-motor to move said slide in either direction along said track.

4. The color filter assembly of claim 3 further comprising two limit switches bilaterally disposed in said track, a control lever mounted said slide, said servo-motor being stopped when said control lever touches either limit switch.

5. The color filter assembly of claim 1 further comprising a second motor drive mounted on said slide and controlled to turn said color filter wheel through a transmission gear.

6. The color filter assembly of claim 5 wherein said color filter wheel comprises an even number of round holes equiangularly spaced around a circle, a plurality of lens mounts respectively revolvably mounted within the round holes to hold a respective color filter lens, said lens mounts having a respective gear meshed with one another and turned by a third motor drive through a transmission gear to pass across the light of said stage lighting alternatively.

7. The color filter assembly of claim 1 wherein said color filter wheel comprises at least one lens having a plurality of refracting edges to refract light in different directions.

8. The color filter assembly of claim 1 wherein said color filter wheel comprises at least one light tight lens having a plurality of projecting holes for passing the light of said stage lighting.

* * * * *